(12) United States Patent
Wang et al.

(10) Patent No.: US 10,015,374 B2
(45) Date of Patent: Jul. 3, 2018

(54) IMAGE CAPTURING APPARATUS AND PHOTO COMPOSITION METHOD THEREOF

(71) Applicant: Altek Semiconductor Corp., Hsinchu (TW)

(72) Inventors: Yu-Chih Wang, Hsinchu (TW); Shou-Te Wei, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 36 days.

(21) Appl. No.: 15/257,929

(22) Filed: Sep. 7, 2016

(65) Prior Publication Data

US 2017/0374246 A1 Dec. 28, 2017

(30) Foreign Application Priority Data

Jun. 24, 2016 (TW) .............................. 105119818 A

(51) Int. Cl.
*H04N 5/228* (2006.01)
*H04N 5/222* (2006.01)
*H04N 5/225* (2006.01)

(52) U.S. Cl.
CPC ......... *H04N 5/2226* (2013.01); *H04N 5/2257* (2013.01)

(58) Field of Classification Search
CPC ...... G03B 13/30; G02B 7/34; H04N 5/23222; H04N 5/23216; H04N 5/23219;
(Continued)

(56) References Cited

U.S. PATENT DOCUMENTS

2008/0219654 A1* 9/2008 Border ............... H04N 5/23212
396/89
2009/0180771 A1* 7/2009 Liu ........................ G03B 7/097
396/61
(Continued)

FOREIGN PATENT DOCUMENTS

CN 102129550 7/2011
CN 103929596 7/2014
(Continued)

OTHER PUBLICATIONS

"Office Action of Taiwan Counterpart Application," dated Aug. 10, 2017, p. 1-p. 7, in which the listed references were cited.
(Continued)

*Primary Examiner* — Kelly L Jerabek
(74) *Attorney, Agent, or Firm* — JCIPRNET

(57) ABSTRACT

An image capturing apparatus and a photo composition method thereof are proposed. The method is adapted to an image capturing apparatus having a first lens and a depth sensor and includes the following steps. First, a preview frame of a scene is obtained by using the first lens, and depth information of the scene is obtained by using the depth sensor. Next, scene analysis is performed on the preview frame according to the depth information so as to generate a scene analysis result. Next, whether the preview frame satisfies a photo composition requirement is determined according to the scene analysis result and a corresponding photo composition rule. If yes, the first lens is controlled to capture the preview frame; if no, a photo composition suggestion corresponding to the scene is provided according to the photo composition rule corresponding to the scene analysis result.

21 Claims, 2 Drawing Sheets

(58) Field of Classification Search
CPC ...... H04N 2201/3253; G06F 17/30265; G06F 17/30268
See application file for complete search history.

(56) References Cited

U.S. PATENT DOCUMENTS

| | | | | |
|---|---|---|---|---|
| 2009/0256951 | A1* | 10/2009 | Yumiki | G03B 13/30 348/345 |
| 2015/0178592 | A1* | 6/2015 | Ratcliff | H04N 5/23222 382/155 |
| 2015/0341549 | A1* | 11/2015 | Petrescu | H04N 5/23222 348/207.1 |
| 2016/0117834 | A1* | 4/2016 | Wang | G06K 9/4604 382/173 |
| 2016/0142625 | A1* | 5/2016 | Weksler | H04N 5/23222 348/222.1 |
| 2016/0378968 | A1* | 12/2016 | Baca | G06F 21/36 726/19 |
| 2017/0006212 | A1* | 1/2017 | Lee | H04N 5/2226 |
| 2017/0285916 | A1* | 10/2017 | Xu | G06F 3/04845 |

FOREIGN PATENT DOCUMENTS

| | | |
|---|---|---|
| CN | 104732209 | 6/2015 |
| CN | 104935810 | 9/2015 |
| TW | 201445508 | 12/2014 |

OTHER PUBLICATIONS

"Office Action of Taiwan Counterpart Application," dated Feb. 22, 2017, p. 1-p. 6, in which the listed references were cited.

* cited by examiner

IMAGE CAPTURING APPARATUS AND PHOTO COMPOSITION METHOD THEREOF

CROSS-REFERENCE TO RELATED APPLICATION

This application claims the priority benefit of Taiwan application serial no. 105119818, filed on Jun. 24, 2016. The entirety of the above-mentioned patent application is hereby incorporated by reference herein and made a part of this specification.

TECHNICAL FIELD

The disclosure relates to an image capturing technique, in particular to, an image capturing apparatus and a photo composition method thereof.

BACKGROUND

With development in technology, various smart image capturing apparatus, such as tablet computers, personal digital assistants and smart phones, have become indispensable tools for people nowadays. Camera lenses equipped in high-end smart image capturing apparatuses provide same or better specifications than those of traditional consumer cameras, and some even provide three-dimensional image capturing features or near-equivalent pixel qualities to those of digital single lens reflex cameras.

In general, the composition of a photo is a significant factor for evaluating its aesthetic quality. The type of a scene, the characteristics such as view, angle, orientation, brightness, and color of each element should be considered and arranged for decent photo composition. Thus, the user is required to have photo composition and shooting skills in order to capture images that possess high aesthetic quality. Moreover, in most photo composition approaches which only analyze two-dimensional image data of the scene without considering its three-dimensional orientation structure, accurate photo composition could not be easily attained.

SUMMARY OF THE DISCLOSURE

Accordingly, an image capturing apparatus and a photo composition method thereof are proposed in the disclosure, where an accurate view-finding approach is provided for the user to capture images which possess high aesthetic quality.

According to one of the exemplary embodiments, the photo composition method is adapted to an image capturing apparatus having a first lens and a depth sensor and includes the following steps. First, a preview frame of a scene is obtained by using the first lens, and depth information of the scene is obtained by using the depth sensor. Scene analysis is performed on the preview frame according to the depth information so as to generate a scene analysis result. Next, whether the preview frame satisfies a photo composition requirement is determined according to the scene analysis result and its corresponding photo composition rule. If yes, the first lens is controlled to capture the preview frame; if no, a photo composition suggestion corresponding to the scene is provided according to the photo composition rule corresponding to the scene analysis result.

According to one of the exemplary embodiments, the image capturing apparatus includes a first lens, a depth sensor, a memory, and a processor, where the processor is coupled to the first lens, the depth sensor, and the memory. The memory is configured to store photo composition rules. The processor is configured to obtain a preview frame of a scene by using the first lens, to obtain depth information of the scene by using the depth sensor, to perform scene analysis on the preview frame according to the depth information to generate a scene analysis result, and to determine whether the preview frame satisfies a photo composition requirement according to the scene analysis result and its corresponding photo composition rule. If yes, the processor is configured to control the first lens to capture the preview frame; if no, the processor is configured to provide a photo composition suggestion corresponding to the scene according to the photo composition rule corresponding to the scene analysis result.

In summary, the proposed image capturing apparatus and photo composition method perform spatial scene analysis on a captured scene by using its preview frame and depth information and apply a photo composition rule so as to determine whether a composition of the preview frame satisfies a photo composition requirement and thereby decide whether to capture the preview frame. Moreover, a feedback of the preview frame would also be provided to the user for accurate view-finding so as to assist and guide the user to capture images which possess high aesthetic quality.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
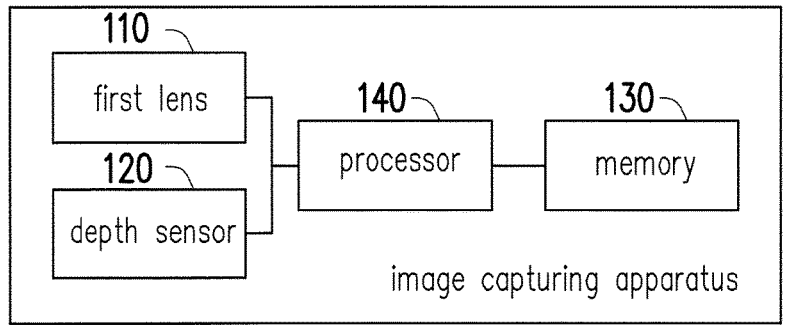
FIG. 1 illustrates a block diagram of an image capturing apparatus in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of an image capturing apparatus in accordance with one of the exemplary embodiments of the disclosure. All components of the image capturing apparatus and their configurations are first introduced in FIG. 1. The functionalities of the components are disclosed in more detail in conjunction with FIG. 2.

Referring to FIG. 1, an image capturing apparatus 100 includes a first lens 110, a depth sensor 120, a memory 130, and a processor 140, where the processor 140 is coupled to the first lens 110, the depth sensor 120, and the memory 130. In the present embodiment, the image capturing apparatus 110 could be, for example, a digital camera, a digital single lens reflex camera or other devices provided with an image capturing feature such as a smart phone, a tablet computer, a personal digital assistant, and so forth. The disclosure is not limited in this regard.

The first lens 110 is a camera lens, which is configured to capture scene images and includes a lens and a sensing element. The sensing element is configured to sense light intensity entering the first lens 110 to thereby generate images. The sensing element is, for example, charge-coupled-device (CCD) elements, complementary metal-oxide semiconductor (CMOS) elements, and yet the disclosure is not limited thereto.

The depth sensor 120 is configured to capture depth information of scene images and could be an active depth sensor or a passive depth sensor. The active depth sensor would calculate depth information of scene images according to light sources, ultrasonic waves, lasers emitted by itself. On the other hand, the passive depth sensor could be another camera lens, which concurrently captures another image of a same scene image as the first lens 110 and calculates depth information of the scene image according to a disparity between the two captured images.

The memory 130 is configured to store images and data and could be one or a combination of a stationary or mobile random access memory (RAM), a read-only memory (ROM), a flash memory, a hard drive or other similar devices.

The processor 140 is configured to control the operation of the components of the image capturing apparatus 100 and could be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices.

Detailed steps of the proposed photo composition method would be illustrated along with each component of the image capturing apparatus 100 hereafter.

Figure 2:
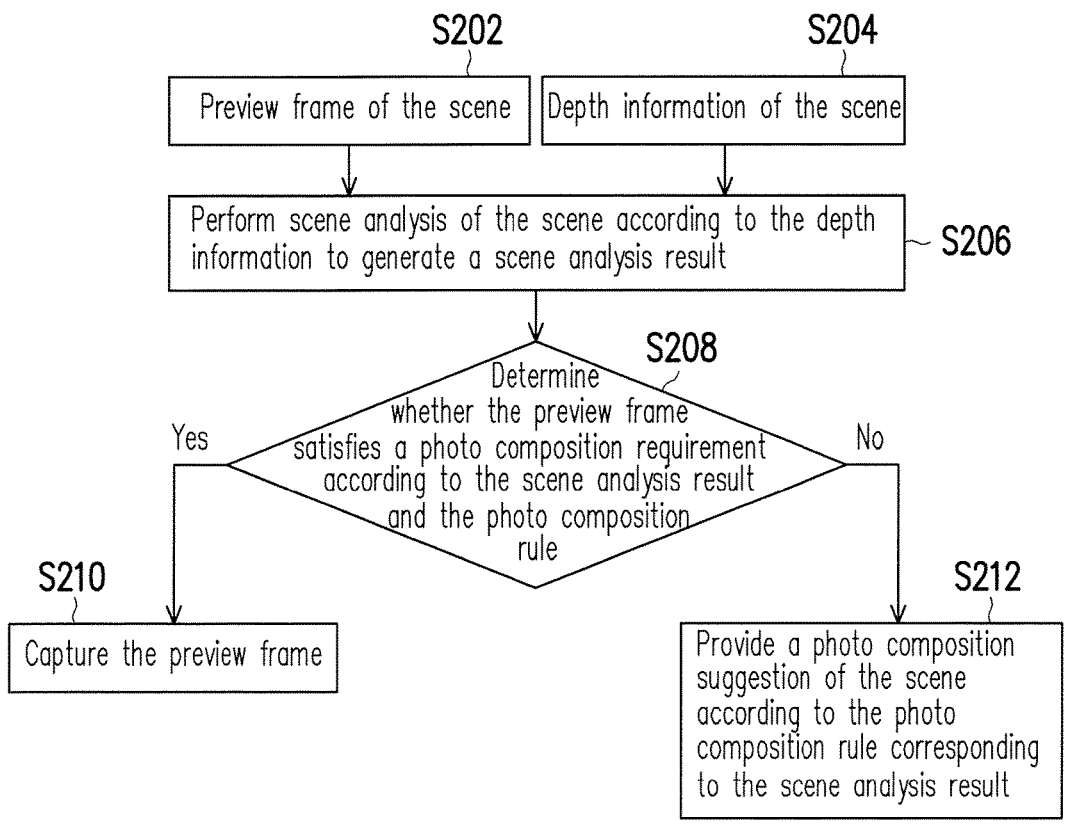
FIG. 2 illustrates a flowchart of a photo composition method of an image capturing apparatus in accordance with one of the exemplary embodiments of the disclosure.

FIG. 2 illustrates a flowchart of a photo composition method of the image capturing apparatus 100 in accordance with one of the exemplary embodiments of the disclosure.

Referring to both FIG. 1 and FIG. 2, when the user of the image capturing apparatus 100 wishes to capture a scene image, the processor 140 would first obtain a preview frame of the scene by using the first lens 110 (Step S202) and obtain depth information of the scene by using the depth sensor 120 (Step S204). The depth information could be a depth map generated based on 8-bit grayscale values (0-255) of quantized depth information of the scene, where the closer the object is to the image capturing apparatus 100, the larger the grayscale values would be. Moreover, in another exemplary embodiment, the depth information of the scene could be represented by depth values. The disclosure is not limited in this regard.

As opposed to any other conventional photo composition approaches which only analyze two-dimensional image data of the scene without considering its three-dimensional orientation structure, after the processor 140 obtains the preview frame and the depth information of the scene, it would further perform scene analysis on the preview frame according to the depth information so as to generate a scene analysis result (Step S206). In detail, the processor 140 could perform scene classification on the preview frame according to the depth information of the scene. The scene types could be outdoor scene, indoor scene, close-up scene, and so forth.

For example, when the processor 140 determines that pixels in the preview frame being in a high-depth interval exceeds a certain percentage of the whole preview frame (i.e. an area of a region within the high-depth interval is greater than a preset far-scene area), the processor 140 would classify the scene as an outdoor scene and set it as the scene analysis result. In terms of depth value, the high-depth interval refers to as an interval in which depth values being greater than a high-depth threshold value (e.g. 2 m). In terms of grayscale value, the high-depth interval refers to as an interval in which grayscale values being less than a low-grayscale threshold value (i.e. 85).

On the other hand, when the processor 140 determines that pixels in the preview frame being in a low-depth interval exceeds a certain percentage of the whole preview frame (i.e. an area of a region within the low-depth interval is greater than a preset close-up-scene area), the processor 140 would classify the scene as a close-up scene and set it as the scene analysis result. In terms of depth value, the low-depth interval refers to as an interval in which depth values being less than a low-depth threshold value (e.g. 30 cm). In terms of grayscale value, the low-depth interval refers to as an interval in which grayscale values being greater than a high-grayscale threshold value (i.e. 170).

When the processor 140 determines that pixels in the preview frame being in an intermediate-depth interval exceeds a certain percentage of the whole preview frame (i.e. an area of a region within the intermediate-depth interval is greater than a preset near-scene area), the processor 140 would classify the scene as an indoor scene and set it as the scene analysis result. In terms of depth value, the low-depth interval refers to as an interval in which depth values being between the low-depth threshold value and the high-depth threshold value. In terms of grayscale value, the intermediate-depth interval refers to as an interval in which grayscale values being between the low-grayscale threshold value and the high-grayscale threshold value.

Moreover, when the processor 140 determines that there exist more than two regions within different depth intervals in the preview frame, it would set the scene analysis result as a scene including at least a foreground and a background. For example, when the preview frame includes two regions with different depth intervals and both the regions exceed a certain percentage of the whole preview frame, such scene could include a background and a foreground. When the preview frame includes three regions with different depth intervals and all the three regions exceed a certain percentage of the whole preview frame, such scene could include a background, a middle-ground, and a foreground. Also, the processor 140 could determine the three-dimensional orientation structure of the scene according to where the regions with different depth intervals are located.

After the processor 140 finishes performing scene analysis on the preview frame, it would determine whether the preview frame satisfies a photo composition requirement according to the scene analysis result and a corresponding photo composition rule (Step S208) so as to determine whether to capture the preview frame by using the first lens 110. Herein, the memory 130 could prestore multiple photo composition rules of a spatial arrangement or color and brightness information associated with one or more main subjects so as to provide the processor 140 for photo composition determination. These photo composition rules could be different composition templates for different scenes commonly used in photography. Once the scene analysis result is obtained, the processor 140 would determine whether it satisfies it corresponding composition template.

For example, in photography, if a main subject is positioned in an area of an image that exhibits the golden ratio, such image may maintain high aesthetic quality due to its proportion, artistry, and harmony. Hence, the aforesaid composition template could be a golden ratio-based composition template such as a rule of thirds composition template and a golden ratio composition template. If the processor 140 determines that the scene includes a foreground and a background, it would further determine whether the foreground, possibly being the main subject, lies on any intersection of two lines (i.e. a power point) in the rule of thirds composition template. If yes, the processor 140 would determine that the preview frame satisfies the photo composition requirement. Moreover, if the processor 140 determines that the preview frame is an outdoor scene including a foreground, a middle-ground, and a background, it would further determine whether the three satisfy the rule of thirds composition template. If yes, the processor 140 would determine that the preview frame satisfies the photo composition requirement.

It should be noted that, the photo composition template may not be limited to be based on the golden ratio. In other exemplary embodiments, the photo composition template may be any composition templates commonly used in photography such as a triangle composition template, a radial composition template, a horizontal composition template, a vertical composition template, a perspective composition template, an oblique composition template, and so forth. The processor 140 could also determine whether the preview frame satisfies the corresponding photo composition requirement according to the scene analysis result.

For example, if the processor 140 determines that the scene is an outdoor scene and the main subject is located at the far scene, it would determine whether the preview frame follows a landscape composition rule. As for the aesthetics in landscape photography, a horizon line would be parallel to a horizontal direction of an image and located at the middle or a bottom one-third of the image. Hence, the processor 140 could detect at least one horizontal line in the preview frame by using edge detection and Hough transformation, and then filter out any horizontal line in the near scene according to the depth information to obtain the horizon line. Next, the processor 140 would determine whether the horizon line is parallel to a horizontal direction of the preview frame and at the middle or bottom one-third of the preview frame. If yes, the processor 140 would determine that the preview frame satisfies the photo composition requirement.

In another exemplary embodiment, if the processor 140 determines that the scene is a close-up scene with an object as a foreground, it would determine whether the preview frame follows a close-up composition rule. For example, the processor 140 would determine whether a foreground object is clear and satisfies the rule of thirds or centroid composition template. If yes, the processor 140 would determine that the preview frame satisfies the photo composition requirement.

Moreover, the color information is also an important factor in photo composition, and thus the processor 140 could further obtain color and brightness information of the preview frame so as to determine whether it satisfies the photo composition requirement. For example, assume that the processor 140 determines that the scene includes a foreground, a middle-ground, and a background. The processor 140 would not only determine whether the preview frame follows the rule of thirds, but would also determine whether the foreground, the middle-ground, and the background all satisfy the photo composition requirement.

Revisiting FIG. 2, in the present embodiment, when the processor 140 determines that the preview frame satisfies the photo composition requirement, it would control the first lens 110 to capture the preview frame (Step S210). On the other hand, when the processor 140 determines that the preview frame does not satisfy the photo composition requirement, it would provide a photo composition suggestion corresponding to the scene according to the photo composition rule corresponding to the scene analysis result (Step S212).

For example, when the foreground of the preview frame is not located at any power point in the rule of thirds composition template, the processor 140 could display the power points and a prompt message on the preview frame to guide the user to move the image capturing apparatus 100 so that the foreground could be located at a proper power point. Moreover, when the processor 140 determines that the main subject is not able to stand out due to the color and brightness information of the foreground, it would provide a suggestion such as insufficient contrast to guide the user to adjust any related parameters and allow the user to capture an image which possesses high aesthetic quality. In another embodiment, when a horizon line in the preview frame is not horizontal, the processor 140 could display a horizontal line at the middle or bottom one-third of the preview frame as well as a prompt message to guide the user to move the image capturing apparatus 100 so that the horizon line in the preview frame would overlap the displayed horizontal line.

Figure 3:
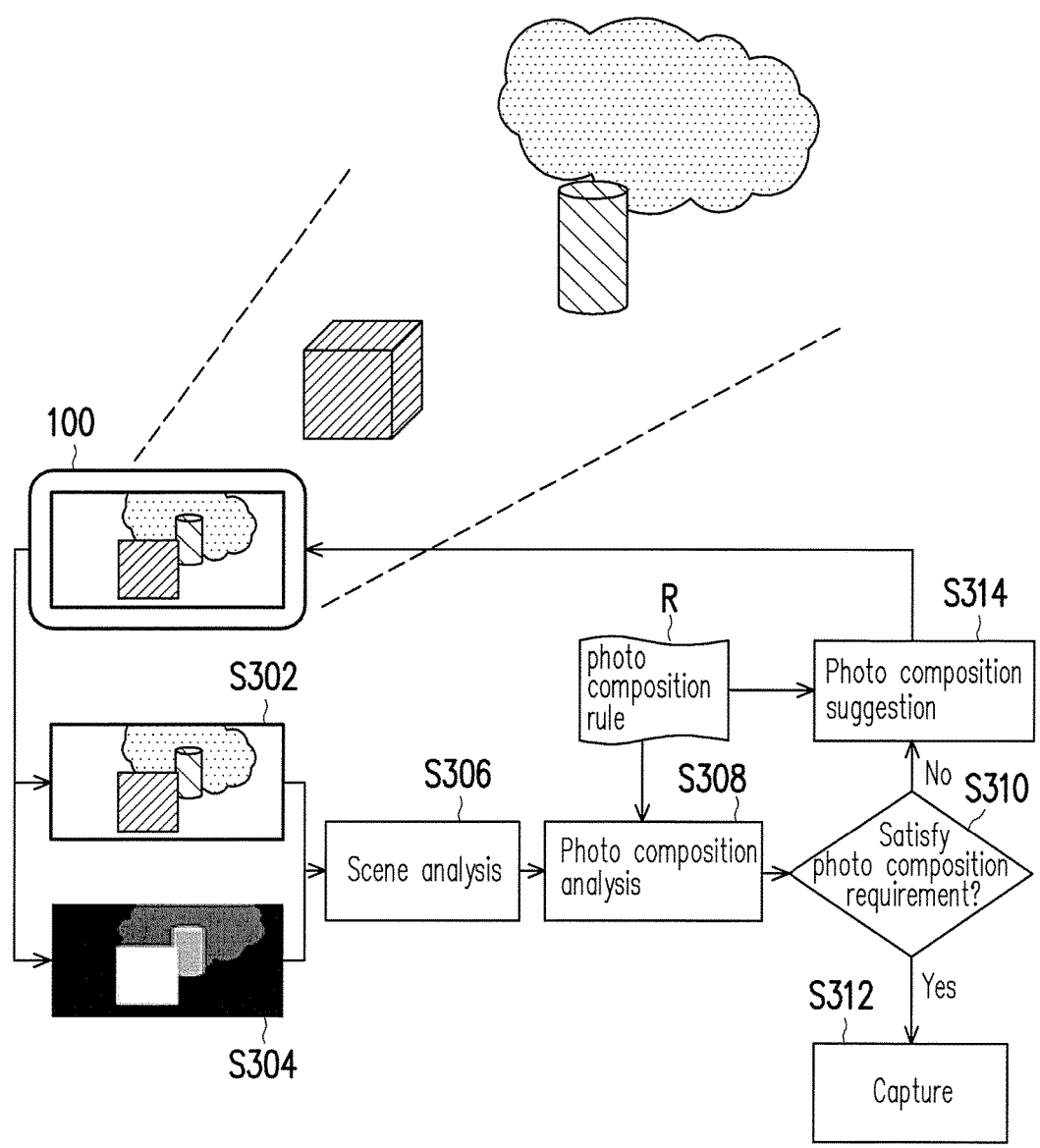
FIG. 3 illustrates a function block flowchart of a photo composition method of an image capturing apparatus in accordance with one of the exemplary embodiments of the disclosure.

The aforesaid photo composition method of the image capturing apparatus 100 could be illustrated as a function block flowchart in FIG. 3 in accordance with one of exemplary embodiments of the disclosure.

Referring to both FIG. 1 and FIG. 3, when the user of the image capturing apparatus 100 wishes to capture a scene, the processor 140 would obtain a preview frame of the scene by using the first lens 110 (Step S302) and obtain depth information of the scene by using the depth sensor 120 (Step S304). Next, the processor 140 would perform scene analysis on the preview frame according to the depth information (Step S306) to generate a scene analysis result (Step S308) and determine whether the preview frame satisfies a photo composition requirement according to the scene analysis result and its corresponding photo composition rule R (Step S310). If yes, the processor 140 would control the first lens 110 to capture the preview frame (Step S312). If no, the processor 140 would provide a photo composition suggestion to the user according to the corresponding photo composition rule R (Step S314) to guide the user to capture an image which possesses aesthetic quality. Details on Steps S302-S314 could refer to related description in the previous paragraphs and would not be repeated herein.

In summary, the proposed image capturing apparatus and photo composition method perform spatial scene analysis on a captured scene by using its preview frame and depth information and apply a photo composition rule so as to determine whether a composition of the preview frame satisfies a photo composition requirement and thereby decide whether to capture the preview frame. Moreover, a feedback of the preview frame would also be provided to the user for accurate view-finding so as to assist and guide the user to capture images which possess high aesthetic quality.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A photo composition method, adapted to an image capturing apparatus having a first lens and a depth sensor, wherein the method comprises the following steps:
   obtaining a preview frame of a scene by using the first lens;
   obtaining depth information of the scene by using the depth sensor;
   performing scene analysis on the preview frame according to an area of a region within a specific depth interval in the preview frame based on the depth information so as to generate a scene analysis result, wherein the scene analysis result comprises an outdoor scene, a close-up scene, and an indoor scene;
   determining whether the preview frame satisfies a photo composition requirement according to the scene analysis result and a corresponding photo composition rule;
   if yes, controlling the first lens to capture the preview frame; and
   if no, providing a photo composition suggestion corresponding to the scene according to the photo composition rule corresponding to the scene analysis result.

2. The method according to claim 1, wherein the step of performing scene analysis on the preview frame according to the area of the region within the specific depth interval in the preview frame based on the depth information so as to generate the scene analysis result comprises:
   when an area of a region within a high-depth interval in the preview frame is greater than a preset far-scene area, setting the scene analysis result as the outdoor scene, wherein a depth value of each pixel within the high-depth interval is greater than a high-depth threshold value.

3. The method according to claim 2, wherein a grayscale value of the each pixel within the high-depth interval is less than a low-grayscale threshold value.

4. The method according to claim 1, wherein the step of performing scene analysis on the preview frame according to the area of the region within the specific depth interval in the preview frame based on the depth information so as to generate the scene analysis result comprises:
   when an area of a region within a low-depth interval in the preview frame is greater than a preset close-up-scene area, setting the scene analysis result as the close-up scene, wherein a depth value of each pixel within the low-depth interval is less than a low-depth threshold value.

5. The method according to claim 4, wherein a grayscale value of the each pixel within the low-depth interval is greater than a high-grayscale threshold value.

6. The method according to claim 1, wherein the step of performing scene analysis on the preview frame according to the area of the region within the specific depth interval in the preview frame based on the depth information so as to generate the scene analysis result comprises:
   when an area of a region within an intermediate-depth interval in the preview frame is greater than a preset near-scene area, setting the scene analysis result as the indoor scene, wherein a depth value of each pixel within the intermediate-depth interval is between a low-depth threshold value and a high-depth threshold value.

7. The method according to claim 6, wherein a grayscale value of the each pixel within the intermediate-depth interval is between a low-grayscale threshold value and a high-grayscale threshold value.

8. The method according to claim 1, wherein the photo composition rule comprises at least one selected from a group consisted of spatial arrangement, color and brightness information associated with at least one main subject.

9. The method according to claim 1, wherein the step of performing scene analysis on the preview frame according to the area of the region within the specific depth interval in the preview frame based on the depth information so as to generate the scene analysis result comprises:
   when there exist more than two regions within different depth intervals in the preview frame, setting the scene analysis result as a scene comprising at least a foreground and a background.

10. The method according to claim 9, wherein the step of determining whether the preview frame satisfies the photo composition requirement according to the scene analysis result and the corresponding photo composition rule comprises:
    determining whether the foreground satisfies a golden ratio rule to accordingly determine whether the preview frame satisfies the photo composition requirement.

11. The method according to claim 1, wherein when the scene analysis result is the close-up scene with a foreground object, the step of determining whether the preview frame satisfies the photo composition requirement according to the scene analysis result and the corresponding photo composition rule comprises:
    determining whether the foreground object is clear and satisfies a golden ratio rule or at a middle of the preview frame to accordingly determine whether the preview frame satisfies the photo composition requirement.

12. The method according to claim 1, wherein when the scene analysis result is the outdoor scene with a foreground object, the step of determining whether the preview frame satisfies the photo composition requirement according to the scene analysis result and the corresponding photo composition rule comprises:
obtaining a horizon line in the preview frame; and
determining whether the horizon line is parallel to a horizontal direction of the preview frame and at a middle or bottom one-third of the preview frame so as to accordingly determine whether the preview frame satisfies the photo composition requirement.

13. The method according to claim 12, wherein the step of obtaining the horizon line of the preview frame comprises:
detecting at least one horizontal line in the preview frame by using edge detection and Hough transform; and
filtering out any horizontal line in a near scene according to the depth information to obtain the horizon line.

14. An image capturing apparatus comprising:
a first lens;
a depth sensor;
a memory, configured to store a plurality of photo composition rules; and
a processor, coupled to the first lens, the depth sensor, and the memory, wherein the processor is configured to obtain a preview frame of a scene by using the first lens, obtain depth information of the scene by using the depth sensor, perform scene analysis on the preview frame according to an area of a region within a specific depth interval in the preview frame based on the depth information so as to generate a scene analysis result, and to determine whether the preview frame satisfies a photo composition requirement according to the scene analysis result and a corresponding photo composition rule, wherein if yes, the processor is configured to control the first lens to capture the preview frame, and wherein if not, the processor is configured to provide a photo composition suggestion corresponding to the scene according to the photo composition rule corresponding to the scene analysis result, wherein the scene analysis result comprises an outdoor scene, a close-up scene, and an indoor scene.

15. The image capturing apparatus according to claim 14, wherein:
when an area of a region within a high-depth interval in the preview frame is greater than a preset far-scene area, the processor is configured to set the scene analysis result as the outdoor scene, wherein a depth value of each pixel within the high-depth interval is greater than a high-depth threshold value;
when an area of a region within a low-depth interval in the preview frame is greater than a preset close-up-scene area, the processor is configured to set the scene analysis result as the close-up scene, wherein a depth value of each pixel within the low-depth interval is less than a low-depth threshold value; and
when an area of a region within an intermediate-depth interval in the preview frame is greater than a preset near-scene area, the processor is conjured to set the scene analysis result as the indoor scene, wherein a depth value of each pixel within the intermediate-depth interval is between the low-depth threshold value and the high-depth threshold value.

16. The image capturing apparatus according to claim 15, wherein a grayscale value of the each pixel within the high-depth interval is less than a low-grayscale threshold value, a grayscale value of the each pixel within the low-depth interval is greater than a high-grayscale threshold value, and a grayscale value of the each pixel within the intermediate-depth interval is between the low-grayscale threshold value and the high-grayscale threshold value.

17. The image capturing apparatus according to claim 15, wherein when there exist more than two regions within different depth intervals in the preview frame, the processor is configured to set the scene analysis result as a scene comprising at least a foreground and a background and determine whether the foreground satisfies a golden ratio rule to accordingly determine whether the preview frame satisfies the photo composition requirement.

18. The image capturing apparatus according to claim 15, wherein when the scene analysis result is the close-up scene with a foreground object, the processor is configured to determine whether the foreground object is clear and satisfies a golden ratio rule or at a middle of the preview frame to accordingly determine whether the preview frame satisfies the photo composition requirement.

19. The image capturing apparatus according to claim 15, wherein when the scene analysis result is the outdoor scene with a foreground object, the processor is configured to obtain a horizon line in the preview frame and determine whether the horizon line is parallel to a horizontal direction of the preview frame and at a middle or bottom one-third of the preview frame so as to accordingly determine whether the preview frame satisfies the photo composition requirement.

20. The image capturing apparatus according to claim 15, wherein the processor is configured to detect at least one horizontal line in the preview frame by using edge detection and Hough transform and filter out any horizontal line in a near scene according to the depth information to obtain the horizon line.

21. The image capturing apparatus according to claim 14, wherein the photo composition rule comprises at least one selected from a group consisted of spatial arrangement, color and brightness information associated with at least one main subject.

* * * * *